United States Patent [19]

Stearns

[11] 4,306,881

[45] Dec. 22, 1981

[54] CARBON SLURRY FUELS

[75] Inventor: Richard S. Stearns, West Chester, Pa.

[73] Assignee: Suntech, Inc., Philadelphia, Pa.

[21] Appl. No.: 237,223

[22] Filed: Feb. 23, 1981

[51] Int. Cl.³ .................................................. C10L 1/32
[52] U.S. Cl. .......................................... 44/51; 44/63; 44/67; 44/76
[58] Field of Search ........................... 44/51, 63, 67, 76

[56] References Cited

U.S. PATENT DOCUMENTS 2,590,733  3/1952  Stillman .................................... 44/51
3,764,547  10/1973  Schlinger et al. ....................... 44/51

OTHER PUBLICATIONS

Chemical Week, Oct. 29, 1980, p. 79.

Jeffrey et al., (AICHE) Journal; vol. 22, No. 3, May 1976, p. 417.

*Primary Examiner*—Jacqueline V. Howard
*Attorney, Agent, or Firm*—J. Edward Hess; Donald R. Johnson; Paul Lipsitz

[57] ABSTRACT

A liquid composition suitable as a high performance fuel and having improved rheological and stability properties comprising a liquid hydrocarbon having carbon particles dispersed therein of at least two disparate particle sizes, said two carbon particles being (1) a semi-reinforcing black having an average particle diameter of about 60 to about 100 mu and (2) a high abrasion furnace black having an average particle diameter of about 20 to about 50 mu.

7 Claims, No Drawings

CARBON SLURRY FUELS

It is known that the volumetric net heat of combustion of liquid fuels can be increased by adding to the liquid finely divided solids such as carbon which have densities substantially greater than that of the liquids themselves and are also capable of being consumed via an oxidation process involving the formation of gases. In making such slurry fuels it is desirable to obtain a liquid product which is pumpable, i.e., it should exhibit a low viscosity at least under shear and will have other rheological properties that will enable it to be atomized in a nozzle and burned, say in a ramjet or turbine engine. A particle of high density is important in order to increase the volumetric heat of combustion, or conversely, for a given volumetric heat of combustion a high density particle enables a lower particle concentration to be used resulting in better rheological properties (e.g. a more fluid dispersion). Also, the dispersion of particles in the fuel must also be stable and not settle out over a period of time.

U.S. Pat. No. 2,754,267 discusses this problem to some extent and discloses suspensions of carbon in a fuel oil used for increasing flame radiation where the carbon-containing fuel oil is injected into steel mill furnaces. In the disclosure of this patent carbon blacks are used with a large exposed surface area having monomolecular layers of certain polymers on the surface, the carbon particles being preferably anisometric (i.e., not spherical) and of a particle size diameter of the shortest dimension of less than about 1 micron, preferably 0.02 to 0.8 micron.

It is also known that spherically shaped carbon particles can be dispersed in jet fuels (Final Report; Ramjet Fuels Analysis Supplement, Contract No. Y6E140, Ashland Chemical Company, Research and Development Division, Process Development Section, L. J. Franier and P. M. Colling). However, as pointed out in this report, a concentration of carbon particles above 40% by weight could not be achieved and such concentrations are below that required to give an effective carbon-slurry fuel.

What is required for an effective carbon-slurry fuel is a liquid slurry which is highly stable, has suitable viscosity characteristics (e.g. will flow properly during use), and which has a high carbon content so that the formulation can yield high thermal energy. Thus, the carbon slurry fuel composition must have properties that are unique with respect to its rheological properties and stability and, therefore, which make it a highly desirable fuel for use in high performance gas turbine engines such as those utilized by manned aircraft, military missiles, or various types of self propelled vehicles such as trucks, military tanks, etc. where there is a premium placed on the heat content of the fuel in terms of BTU/gallon, i.e., volume limited applications. These fuel compositions must be pumpable, which puts constraints on the viscosity, while at the same time exhibiting a high degree of stability with respect to the settling of the dispersed particles over a long time period. In addition the net volumetric heat of combustion expressed as BTU/gallon must be kept as high as possible which requires as high a dispersed carbon content as can be tolerated in the hydrocarbon fuel and still maintain a flowable dispersion under the conditions of shear encountered in fuel transport from the vehicle storage vessel to the combustion chamber. In general, the required net heat of combustion for such fuels must be at least about 170,000 BTU per gallon of slurry.

The addition of appropriate amounts of a small particle size black of about 20 to about 50 mu, such as a high abrasion furnace black (HAF) to a fuel will produce a stable high energy fuel, but to do so requires so much to produce a product of about 170,000 BTU per gallon of slurry that the fuel composition becomes very viscous or even gelled and cannot be pumped to the engine. A semi-reinforcing furnace black (SRF) of particle size from about 60 to about 100 mu will produce a slurry fuel of suitable viscosity, but with poor stability.

In accord with this invention a novel slurry fuel composition of high particulate concentration and of satisfactory stability and rheological properties is provided, comprising a liquid hydrocarbon having dispersed therein at least about 40% by weight of the hydrocarbon of carbon particles comprising two disparate particle sizes wherein one carbon particle has an average particle diameter of from about 70 to about 100 mu and the second carbon particle has an average particle diameter of from about 20 to about 50 mu.

A suitable carbon particle having an average particle diameter of from about 60 to about 100 mu is semi-reinforcing black (SRF) and a suitable carbon particle of average particle diameter of from about 20 to about 50 mu is high abrasion furnace (HAF) black. Both of these blacks are commercially available.

The liquid hydrocarbons employed to make the slurry fuels will be conventional jet fuel types such as methylcyclohexane, JP-4, JP-5, JP-9, JP-10, RJ-4, RJ-5, RJ-6 and the like or their mixtures. The technology for making slurry fuels from these materials is well known and will be employed in making the fuels of this invention. In a preferred embodiment of the invention a blend of RJ-5 and JP-10 will be used, preferably in a volumetric ratio of about 60:40.

The carbon slurry formulation will contain appropriate additives in stabilizing amounts to aid in the dispersing and stabilizing of the suspension. Any one or more of a number of commercial surfactants can be utilized as, for example, succinnimide types, barium sulfonate, calcium sulfonate, imide type pigment dispersants, and the like. For long-term stability, it may be desirable to add an aluminum soap to the dispersion. A preferred agent to impart stability to the suspension is an oligomeric succinnimide containing about 2.3% nitrogen (sold by Edwin Cooper as Hitec E-645 Deflocculant) and is added at a level of from 2 to about 10% by weight of the carbon content of the slurry. Preferably from about 2 to about 5% of surfactant will be used.

The fuel composition of the invention will have a stability of at least about 0.9 which is the ratio representing the concentration of black in the upper one milliter of a 15 ml sample after centrifuging the composition for eight hours at 2285 RPM (about 1000 G's) divided by the black concentration before centrifugation. Such stability will be obtained by using HAF black in a stabilizing amount which will be from about 2.5 to about 12.5% of the total black used. Above about 12.5% HAF black the composition is too viscous for use in jet engines and the like.

The total amount of black in the fuel will vary from about 40% to about 65% by weight of the composition, preferably from about 40 to about 50%. Much above 55% often gives a viscosity too high to be useful as a pumpable fuel. As indicated, both the SRF black and the HAF black are well known products readily available commercially and require no special treatment before use in the formulation. In making the carbon slurry fuel of the invention all that is required is to thoroughly mix the ingredients into the hydrocarbon liquid with a high speed mixer or other device to ensure that a well dispersed product is obtained. It will be understood, that appropriate milling procedures, use of dispersants and other conventional techniques will be used in preparing the dispersions.

The fuel composition of the invention, when used as fuel for a missile system, will be optimally characterized by a pour point of at least −65° F. and a Haacke viscosity at about 70° F. of from about 100 to about 500 cps. The slurry fuel is readily pumped and atomized, and will be stable over a temperature range of from about 200° F. to about −65° F.

In order to further illustrate the invention the following example is given:

EXAMPLE 1

To a mixture of RJ-5 and JP-10 in a volumetric ratio of 60:40 there was added various proportions of a semi-reinforcing black and a high abrasion furnace black, and a deflocculant (Hitec E-645) at a concentration of 5% by weight of the carbon black. The final composition contained 55% by weight of hydrocarbon fuel, 43% black and 2% of defloculant. A high speed mixer (15,000 to 20,000 RPM) was used to mix the ingredients for one hour in a two liter stainless steel flask with cooling provided to maintain the temperature at ambient conditions.

The finished slurry was subjected to measurements of viscosity and stability.

Viscosity was measured on a Haake rotating cylinder viscometer at an rpm where the slurry viscosity was substantially constant with shear rate, i.e., Bingham or Newtonian in behavior.

Stability was measured by centrifuging 15 ml of the slurries for eight hours at 2285 rpm (ca 1000 G's) in a laboratory bench top centrifuge and measuring the solids content of the upper one ml of slurry.

The variation of stability and viscosity with HAF black composition is shown in Table I. Note that stability is maximum (i.e., 1.0) at a level of 10% HAF black and at this level, the viscosity is suitable for proper flow in an engine system.

TABLE I
STABILITY OF SRF/HAF BLENDS
IN A 60:40 VOLUME MIXTURE
OF RJ-5 AND JP-10

| Wt. % of HAF in Total Black+ | Stability* ($C/C_0$) | Haake Viscosity (n', cP) at 22° C. |
|---|---|---|
| 0 | 0.654 | 112 |
| 5 | 0.850 | 137 |
| 10 | 1.000 | 140 |
| 15 | 0.912 | 159 |
| 20 | 0.873 | 178 |
| 25 | 0.077 | 187 |
| 30 | 0.056 | 220 |
| 35 | 0.049 | 306 |

*Eight hours at 1000 × G; C = Black concentration after centrifugation; $C_0$ = Black concentration before centrifugation.
+Black used characterized as ASTM N-330.

I claim:

1. A liquid composition suitable as a high density high performance fuel and having improved rheological and stability properties comprising a liquid hydrocarbon fuel having carbon particles dispersed therein of at least two disparate particle sizes, one of said carbon particles having an average particle diameter of from about 60 to about 100 mu and the other particle having an average particle diameter of about 20 to about 50 mu, said carbon particles of said 20 to 50 mu range being present in an amount from about 7.5 to about 12.5% by weight of the total carbon solvent.

2. The composition of claim 1 wherein the carbon particles comprise a semi-reinforcing furnace (SRF) black and a high abrasion furnace (HAF) black.

3. The composition of claim 2 wherein the fuel is a mixture of RJ-5 and JP-10 in a volume ratio of 60:40.

4. A liquid composition suitable as a high performance fuel and having improved rheological and stability properties comprising a liquid hydrocarbon fuel having a density of at least about 0.9 and having carbon particles dispersed therein of at least two disparate particle sizes, one of said carbon particles having an average particle diameter of from about 60 to about 100 mu and the other particle having an average particle diameter of about 20 to about 50 mu, said carbon particles of said 20 to 50 mu range being present in an amount from about 7.5 to about 12.5% by weight of the total carbon present, the amount of total weight, and said fuel containing a stabilizing amount of a surfactant.

5. The composition of claim 4 wherein the carbon particles comprise SRF black and HAF black.

6. The composition of claim 5 wherein the amount of HAF black is about 10% of the total black present.

7. The composition of claim 6 wherein the fuel is a 60:40 by volume mixture of RJ-5 and JP-10 and the total amount of carbon black is 43% by weight.

* * * * *